United States Patent
Fuller

[11] Patent Number: 5,707,291
[45] Date of Patent: Jan. 13, 1998

[54] STRESSED HOOP SLIP CLUTCH

[75] Inventor: Douglas D. Fuller, Contoocook, N.H.

[73] Assignee: Presstek, Inc., Hudson, N.H.

[21] Appl. No.: 602,321

[22] Filed: Feb. 16, 1996

[51] Int. Cl.$^6$ ............................................. F16D 7/02
[52] U.S. Cl. ............................................. 464/30; 192/56.1
[58] Field of Search ............................ 464/30, 77, 88, 464/41; 192/56.1, 56.5; 74/411

[56] References Cited

U.S. PATENT DOCUMENTS

| | | | |
|---|---|---|---|
| 793,601 | 6/1905 | Moore | 464/41 |
| 2,409,192 | 10/1946 | Collins | 464/30 |
| 2,835,517 | 5/1958 | Beerli | 464/41 X |
| 3,254,539 | 6/1966 | Ma | 464/30 X |
| 3,321,565 | 5/1967 | Peterson et al. | 464/30 X |
| 3,741,287 | 6/1973 | Mittman | 464/77 X |
| 3,991,590 | 11/1976 | Breme et al. | 192/56.1 X |
| 4,063,466 | 12/1977 | Showalter | 74/574 |

*Primary Examiner*—Daniel P. Stodola
*Assistant Examiner*—Eileen A. Dunn
*Attorney, Agent, or Firm*—Cesari and McKenna, LLP

[57] ABSTRACT

A controlled slip torque transmitting apparatus comprises a first substantially cylindrical rotary member which is rigid and has a longitudinal axis of rotation. A somewhat compliant tubular rotary member snugly encircles the first member, the two members being rotatable relatively about that axis. The second member has at least three outwardly extending projections with free ends. An elastic band surrounds the projections so as to exert compressive loads on the body thereby pressing the body against the tubular member at the roots of the lobes so that the clutch has an inherent break away torque when the two members are moved relatively.

8 Claims, 1 Drawing Sheet

5,707,291

STRESSED HOOP SLIP CLUTCH

FIELD OF THE INVENTION

This invention relates to a clutch. It relates especially to a clutch designed to allow relative motion between the clutch input and output while requiring a relatively constant predetermined relative torque to maintain such motion.

BACKGROUND OF THE INVENTION

Slip clutches are used in a variety of applications and to accommodate a variety of needs. These include torque transmission between shafts, torque transmission from shaft to gear and vice versa, braking of shaft rotation, among other torque transmission and/or torque limiting applications.

Invariably, such clutches include first and second members movable relative to one another and means providing a selected amount of torsional friction between the two members so that relative motion of the two members occurs only when they are subjected to a relative torque which exceeds a predetermined "break away" torque associated with the clutch.

Conventionally, the torsional friction may be provided by plates associated with the two members and pressed together face to face or by spring loaded shoes mounted to one member and arranged to frictionally engage the other member, for example. Indeed, there are myriad mechanisms for providing controlled slippage between two rotary members. However, these prior mechanisms usually have certain drawbacks of one kind or another. Some utilize springs and other small parts which are difficult to assemble; some have a relatively large number of parts which increases their cost and complexity and still others tend to be rather bulky so that they are difficult to incorporate to relatively small devices and machines where space is at a premium.

SUMMARY OF THE INVENTION

Accordingly, the present invention aims to provide an improved slip clutch.

Another object of the invention is to provide a slip clutch which may be composed of only three separate parts.

Yet another object of the invention is to provide such a clutch which can be made quite small and compact.

A further object of the invention is to provide a slip clutch whose parts can be made in quantity at relatively low cost using conventional machining or molding techniques.

Still another object of the invention is to provide a slip clutch of simple design which can be used in a wide variety of torque transmission and/or torque limiting applications.

A further object is to provide a clutch of this type which is bi-directional.

Other objects will, in part, be obvious and will, in part, appear hereinafter.

The invention accordingly Comprises the features of construction, combination of elements and arrangement of parts which will be exemplified in the following detailed description, and the scope of the invention will be indicated in the claims.

Briefly, the clutch Comprises a first member which is cylindrical and of a rigid material and a second, somewhat Compliant tubular member which snugly surrounds the first member, the two members being rotatable relative to one another about their common axis. The second member is formed with at least three radially outwardly extending projections or lobes. The outer ends of the lobes define an imaginary circle whose diameter is appreciably larger than the diameter of the first member.

The clutch also includes a third member, namely a flexible resilient normally cylindrical hoop whose inside diameter is somewhat less than the diameter of the circle defined by the lobes of the second member. The number, dimensions and spacing of the lobes is such that the hoop can be forcibly engaged over the ends of the lobes thereby causing the hoop to be distorted from its normal circular shape to a noncircular shape. The thus-distorted resilient hoop applies radial compression loads to the second member. Resultantly, the relatively compliant second member is pressed against the first member at the roots of the lobes so that appreciable torsional friction exists between the two members if there is an attempt to rotate one member relative to the other. As a consequence, when one member is rotated, the other member will rotate along with it unless a countervailing torque is applied to the other member which exceeds the "break away" torque of the clutch. The break away torque may be defined as the torque required to overcome the static friction presented by the opposing surfaces of the two members under the lead conditions imposed by the resilient hoop.

Once relative rotation of the two clutch members does occur, a constant relative torque dependent upon the coefficient of kinetic friction at the boundary of the two members is required to maintain the relative motion of the two members.

Depending upon the particular application, either member may receive the torque input or provide the torque output. For example, the first member may be coupled to a driven rotary input shaft and the second member may be coupled to an output shaft. In this case, the two shafts will rotate in unison unless the torque differential on the two shaft exceeds the break away torque of the clutch. In such an application, the output shaft may be connected to a roller around which web is being wound, the slip clutch being present to prevent undo tension on the web being wound.

In another application, the second member may be provided with teeth so that it forms a spur gear which meshes with a driven gear. In that event, the driven gear will rotate along with an input shaft coupled to the first member so long as the break away torque of the clutch is not exceeded. If that torque is exceeded, there will be controlled rotational slippage between the gear and the shaft.

In yet another application, means may be provided to retard one of the clutch members which will result in the other member being braked to a stop unless the relative torque on the two members exceeds the break away torque of the clutch.

These, and many other uses of the clutch may be envisioned.

The three major components of my clutch can be manufactured relatively easily using standard machining or molding techniques and the parts are particularly adapted for automatic assembly. Therefore, the clutch should be relatively inexpensive to make in quantity.

Also, the clutch is quite compact and may be scaled up or down to suit particular applications.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENT

Figure 1:
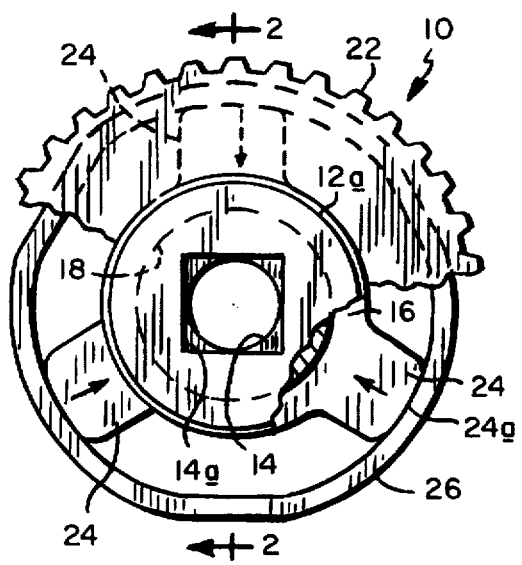
FIG. 1 is a side elevational view, with parts broken away, showing a slip clutch incorporating the invention.
Figure 2:
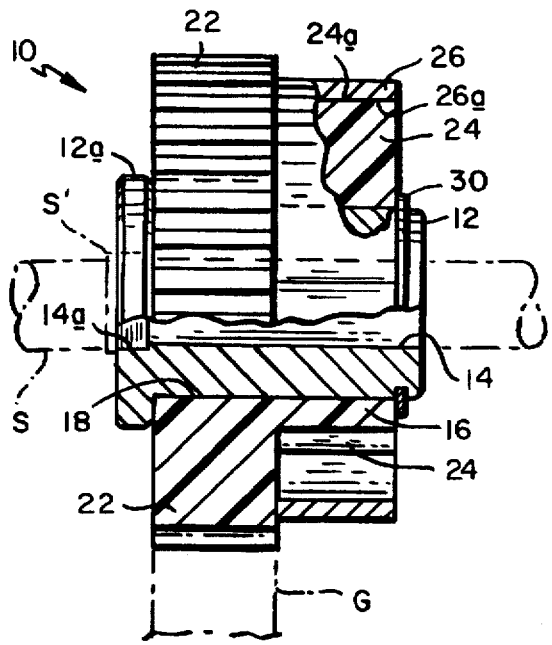
FIG. 2. is a sectional view taken along line 2—2 of FIG. 1, with some parts shown in elevation.
Figure 3:
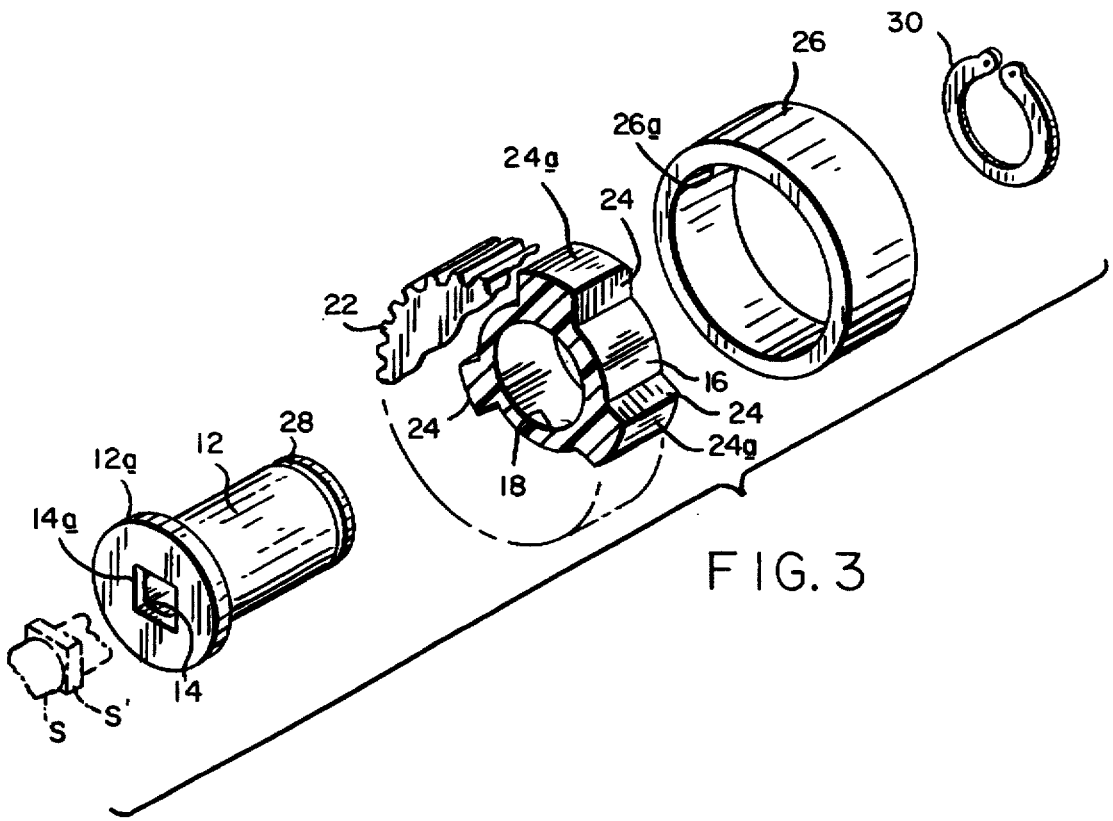
FIG. 3 is an exploded perspective view, on a smaller scale, showing the elements of the clutch in greater detail.

Referring to FIGS. 1 to 3 of the drawing, the clutch 10 specifically illustrated there is intended to couple torque between a rotary shaft S and a spur gear G shown in phantom in FIG. 2. It should be understood, however, that the clutch may be used in many other applications where it is desired to provide relative motion between two rotary members, while requiring a relatively constant predetermined relative torque to maintain such relative motion.

Clutch 10 includes a first rotary member in the form of a rigid cylindrical sleeve 12 having a radial flange 12a at one end. For example, the sleeve may be of metal, e.g., steel, or of a strong rigid plastic material, which provides a smooth, relatively non-wearing outer surface on sleeve 12. A cylindrical passage 14 extends along the longitudinal axis of sleeve 12, the passage being sized to snugly receive the shaft S. Preferably, the end of the passage 14 at flange 12a is provided with a non-circular, e.g., square, counterbore 14a. In that event, the counterbore is arranged to receive a similarly shaped key S' on shaft S to rotatably lock the sleeve to the shaft. The axial position of the sleeve on the shaft may be maintained by any suitable means such as a set screw (not shown).

The clutch also includes a second rotary member in the form of a somewhat compliant tubular body 16 having an axial cylindrical passage 18 sized to enable body 16 to be received on sleeve 12 so that one end of body 16 seats against the sleeve flange 12a as best seen in FIG. 2. Preferably, the diameter of the passage 18 is only slightly larger than that of sleeve 12 so that there is a relatively tight fit between the body and the sleeve.

As shown in the drawing figures, the end segment of body 16 that faces the sleeve flange 12a is formed with engageable projection means, i.e., it is enlarged radially and shaped to form a spur gear 22. When the clutch 10 is in use, that gear 22 is arranged to mesh with the spur gear G shown in phantom in FIG. 2.

The opposite end segment of body 16 is formed with at least three radially outwardly extending projections or lobes 24. The illustrated clutch has exactly three such lobes spaced at equal angles about the longitudinal axis of body 16. However, another such clutch could may have four or more lobes.

As best seen in FIG. 3, the lobes 24 have the general shape of rectangular solids. Preferably, however, their radially outer surfaces 24a are curved about the axis of body 16 so that those surfaces in toto define an imaginary circle or cylinder. The diameter of that imaginary circle or cylinder may be more or less or the same as the diameter of the spur gear 22.

As noted above, the clutch body 16 should be somewhat compliant. Accordingly, it is preferably made of a strong, but compliant, plastic material which has a low wear rate when used with sleeve 12.

The third major component of clutch 10 is a flexible, resilient hoop, loop or band 26 which is arranged to engage around the lobes 24 of clutch body 16.

The hoop is basically a compliant, thin-walled ring, although the thickness of the hoop is exaggerated in the drawing figures for ease of illustration. The hoop material may vary but should have good "creep" resistance at the stress levels to which it will be subjected when the clutch 10 is in use. Obviously, the material should have a yield strength significantly higher than the stress imposed upon it when the hoop 26 is forceably engaged over lobes 24 during assembly of the clutch. A suitable hoop material is steel.

The length of hoop 26 usually corresponds to the lengths of lobes 24 of body 16 and the hoop has a central passage 26a whose diameter is somewhat less than the diameter of the imaginary circle or cylindrical defined by the lobe surfaces 24a. Resultantly, when hoop 26 is forceably engaged over the lobes, it is distorted from its normal circular shape into a non-circular shape as best seen in FIG. 1.

Since the hoop 26 is flexible and resilient or elastic, the inherent restoring forces in the distorted hoop apply symmetricel compression loads to the clutch body 16 at the locations of lobes 24 as shown by the radially inwardly extending arrows in FIG. 1. These forces cause the wall sectors of the body passage 18 at the roots of the lobes to be pressed against sleeve 12 thereby producing torsional friction at those locations that resists relative rotation of sleeve 12 and body 16. However, relative rotation of those two members will occur if the relative torque imposed on the two members exceeds the above-defined break away torque of clutch 10.

The components of clutch 10 are assembled by pressing them together. In other words, first the clutch body 16 is engaged on the sleeve 12. Then, the hoop 26 is forceably engaged over the lobes 24 of the clutch body, which action deforms the hoop from its normal circular shape to the distorted shape shown in FIG. 1. In most cases, the resulting frictional forces between sleeve 12 and body 16 and between lobes 24 and hoop 26 are sufficient to maintain the relative axial positions of those components and thus to maintain the clutch 10 in its assembled condition. However, if desired, the end of sleeve 12 opposite flange 12a may be provided with a circumferential groove 28 as shown in FIG. 3. When the clutch is assembled, that end of the sleeve will project beyond body 16 sufficiently to allow a C-clip 30 to be engaged in groove 28 to retain body 16 on sleeve 12. Since the hoop 26 always moves with the clutch body 16, the elastic forces caused by the distortion of the hoop are invariably sufficient to maintain the axial position of the hoop on the lobes 24 around which it is engaged.

When the clutch 10 is in use, any rotation of shaft S (FIG. 2) in either direction will cause a corresponding rotation of the gear G and vice versa. However, if a retarding force should be imposed on the driven member, e.g., gear G, sleeve 12 will slip relative to the clutch body 16 when the break away torque of the clutch is exceeded. In that event, so long as the relative torque on the two members does exceed a determined constant value related to the coefficient of kinetic friction at the boundary between sleeve 12 and body 16, such relative motion will continue. That relative torque required for continued motion is usually somewhat less than the break away torque of the clutch. The break away characteristic of the clutch 10 may be changed or controlled by selecting a hoop 26 with the desired elastic properties. The break away torque is also affected by the number size and spacing of lobes 24 on body 16.

Rotation of the clutch sleeve 12 relative to the clutch body 16 may cause some wear on the contacting surfaces of those members. As these contacting surfaces wear, the compressive loads imposed on body 16 by hoop 26 will maintain contact forces in the regions of wear, i.e., at the mots of lobes 24. This may cause the hoop 26 distortion to decrease over time thereby reducing the loads applied to body 16. This effect may be minimized by proper selection of materials for sleeve 12 and body 16.

Also, it is preferable that the interference fit between the hoop 26 and the clutch body 16 which causes the distortion of the hoop to its non circular shape be quite large relative to the amount of wear anticipated at the interface of the clutch sleeve and clutch body. With this condition, any wear at the sleeve/body interface would change the preload of the hoop 26 only by a small amount, and, therefore have minimal effect on the break away torque of the clutch. In this way, the clutch 10 may be designed to have a long useful life even when it is used in high or constant duty applications.

It will thus be seen that the objects set forth above, among those made apparent from the preceding description, are efficiently attained. Also, certain changes may be made in the above construction without departing from the scope of the invention. For example, if the clutch is to be used for low relative torque applications, the body 16 may be quite compliant and the hoop 16 may comprise one or more elastic bands stretched around the lobes 24. Also, in a braking application, the gear 22 may be substituted for by a detent selectably engageable by a grounded part to arrest motion of the second clutch member. Therefore, it is intended that all matter contained in the above description or shown in the accompanying drawing shall be interpreted as illustrative and not in a limiting sense.

It is also to be understood that the following claims are intended to cover all of the generic and specific features described herein.

What is claimed is:

1. A controlled slip torque transmitting apparatus comprising
   a substantially cylindrical first rotary member, said member being rigid and having a longitudinal axis of rotation;
   a compliant tubular second rotary member snugly encircling said first member, said members being rotatable relatively about said axis, said second member having at least three projections extending away from said axis and having ends, and
   an elastic hoop surrounding said projections so as to exert compressive loads on said second member so as to press said second member against said first member at the roots of said projections.

2. The apparatus defined in claim 1, wherein the free ends of the projections define an imaginary circle which is appreciably larger than the diameter of said first member.

3. The apparatus defined in claim 1 and further including engageable radial projection means on the second member.

4. The apparatus defined in claim 3 wherein the projection means include a gear.

5. The apparatus defined in claim 3 wherein the projection means include a detent.

6. The apparatus defined in claim 1 wherein the elastic hoop comprises normally cylindrical flexible resilient hoop.

7. The apparatus defined in claim 6 wherein said second member is of plastic and said elastic hoop is of metal.

8. A controlled slip torque transmitting apparatus comprising
   a substantially cylindrical first rotary member having a longitudinal axis;
   a compliant tubular second rotary member snugly encircling said first member, said members being rotatable relatively about said axis, said second member having a plurality of radially outwardly extending lobes with free ends which define an imaginary circle concentric to said axis, and
   a flexible resilient hoop, said hoop having an inside diameter less than the diameter of said imaginary circle and encircling said lobes so that the hoop is stressed into a non-circular shape and presses the second member against the first member at the roots of said lobes.

* * * * *